(12) United States Patent
Haskell (10) Patent No.: US 8,073,268 B2
(45) Date of Patent: Dec. 6, 2011

(54) METHOD AND APPARATUS FOR CODED APERTURE IMAGING

(75) Inventor: Philip Edward Haskell, Portsmouth (GB)

(73) Assignee: Qinetiq Limited, London (GB)

( * ) Notice: Subject to any disclaimer, the term of this patent is extended or adjusted under 35 U.S.C. 154(b) by 728 days.

(21) Appl. No.: 12/278,515

(22) PCT Filed: Feb. 6, 2007

(86) PCT No.: PCT/GB2007/000396
§ 371 (c)(1),
(2), (4) Date: Aug. 6, 2008

(87) PCT Pub. No.: WO2007/091038
PCT Pub. Date: Aug. 16, 2007

(65) Prior Publication Data
US 2009/0022410 A1    Jan. 22, 2009

(30) Foreign Application Priority Data

Feb. 6, 2006 (GB) .................................. 0602372.5

(51) Int. Cl.
*G06K 9/36* (2006.01)
*G06K 9/00* (2006.01)
(52) U.S. Cl. ......... 382/232; 382/128; 356/310; 356/326
(58) Field of Classification Search .......... 382/128–132, 382/232–253; 356/310, 326, 328
See application file for complete search history.

(56) References Cited

U.S. PATENT DOCUMENTS

| 3,860,821 A | 1/1975 | Barrett |
| 3,961,191 A | 6/1976 | Stoner et al. |
| 4,075,483 A | 2/1978 | Tancrell et al. |
| 4,092,540 A | 5/1978 | Barrett |
| 4,165,462 A | 8/1979 | Macovski et al. |
| 4,209,780 A * | 6/1980 | Fenimore et al. ............. 382/278 |

(Continued)

FOREIGN PATENT DOCUMENTS

DE    25 28 641 A1    1/1976

(Continued)

OTHER PUBLICATIONS

Jan. 12, 2011 Office Action issued in U.S. Appl. No. 12/278,528.

(Continued)

*Primary Examiner* — Manav Seth
(74) *Attorney, Agent, or Firm* — Oliff & Berridge, PLC (57) ABSTRACT

Methods for coded aperture imaging, and processing the data from coded aperture imaging are taught. Several snapshots of an image are acquired, each using a different coded aperture array. The several snapshots are combined together with appropriate weightings to form a single equivalent frame as are the aperture functions for the coded aperture arrays used. Combining several frames of data can improve the signal to noise ratio of the decode image and increase the resolution of the image. Preferably a balanced weighting system is used and image reconstruction is performed by inverting the covariance matrix formed by the covariance of the signals from a number of estimated trial points. Using a balanced weighting system reduces the covariance matrix to a diagonal or near diagonal matrix with a corresponding reduction in computational load. The techniques also reduces additive noise. Various technique for compensating for camera motion and identifying motion in the scene are also taught along with suitable apparatus for performing the invention.

20 Claims, 3 Drawing Sheets

U.S. PATENT DOCUMENTS

| | | | |
|---|---|---|---|
| 4,228,420 A * | 10/1980 | Fenimore et al. | 382/324 |
| 4,360,797 A * | 11/1982 | Fenimore et al. | 382/278 |
| 4,389,633 A * | 6/1983 | Fenimore | 382/204 |
| 4,891,844 A * | 1/1990 | Kiri | 382/132 |
| 4,954,789 A | 9/1990 | Sampsell | |
| 5,036,546 A * | 7/1991 | Gottesman et al. | 382/321 |
| 5,047,822 A | 9/1991 | Little, Jr. et al. | |
| 5,115,335 A | 5/1992 | Soref | |
| 5,294,971 A | 3/1994 | Braunecker et al. | |
| 5,311,360 A | 5/1994 | Bloom et al. | |
| 5,426,312 A | 6/1995 | Whitehead | |
| 5,448,395 A | 9/1995 | Lopez et al. | |
| 5,488,504 A | 1/1996 | Worchesky et al. | |
| 5,500,761 A | 3/1996 | Goossen et al. | |
| 5,519,529 A | 5/1996 | Ahearn et al. | |
| 5,552,912 A | 9/1996 | Sharp et al. | |
| 5,579,149 A | 11/1996 | Moret et al. | |
| 5,627,639 A * | 5/1997 | Mende et al. | 356/310 |
| 5,636,001 A | 6/1997 | Collier | |
| 5,636,052 A | 6/1997 | Arney et al. | |
| 5,710,656 A | 1/1998 | Goossen | |
| 5,772,598 A | 6/1998 | Halling | |
| 5,784,189 A | 7/1998 | Bozler et al. | |
| 5,825,528 A | 10/1998 | Goossen | |
| 5,838,484 A | 11/1998 | Goossen | |
| 5,841,579 A | 11/1998 | Bloom et al. | |
| 5,870,221 A | 2/1999 | Goossen | |
| 5,943,155 A | 8/1999 | Goossen | |
| 5,949,571 A | 9/1999 | Goossen et al. | |
| 5,953,161 A | 9/1999 | Troxell et al. | |
| 5,995,251 A | 11/1999 | Hesselink et al. | |
| 6,034,807 A | 3/2000 | Little et al. | |
| 6,069,361 A | 5/2000 | Rubinstein | |
| 6,195,412 B1 * | 2/2001 | Tobin et al. | 378/87 |
| 6,205,195 B1 * | 3/2001 | Lanza | 376/157 |
| 6,324,192 B1 | 11/2001 | Tayebati | |
| 6,329,967 B1 | 12/2001 | Little et al. | |
| 6,392,235 B1 | 5/2002 | Barrett et al. | |
| 6,396,976 B1 | 5/2002 | Little et al. | |
| 6,424,450 B1 | 7/2002 | Goossen | |
| 6,430,333 B1 | 8/2002 | Little et al. | |
| 6,467,879 B1 | 10/2002 | Kubby et al. | |
| 6,519,073 B1 | 2/2003 | Goossen | |
| 6,570,143 B1 | 5/2003 | Neil et al. | |
| 6,737,652 B2 * | 5/2004 | Lanza et al. | 250/363.06 |
| 6,819,463 B2 | 11/2004 | Noonan | |
| 6,819,466 B2 | 11/2004 | Tayebati | |
| 6,856,449 B2 | 2/2005 | Winkler et al. | |
| 7,006,132 B2 | 2/2006 | Pereira et al. | |
| 7,027,634 B2 * | 4/2006 | Odell | 382/144 |
| 7,031,577 B2 | 4/2006 | Painter et al. | |
| 7,209,579 B1 * | 4/2007 | Weisenberger et al. | 382/128 |
| 7,235,773 B1 | 6/2007 | Newman | |
| 7,251,396 B2 | 7/2007 | Larochelle et al. | |
| 7,283,232 B2 * | 10/2007 | Brady et al. | 356/326 |
| 7,415,049 B2 | 8/2008 | Flanders et al. | |
| 7,671,321 B2 * | 3/2010 | Perlman et al. | 250/216 |
| 7,767,949 B2 * | 8/2010 | Perlman et al. | 250/208.1 |
| 7,767,950 B2 * | 8/2010 | Perlman et al. | 250/208.1 |
| 7,888,626 B2 * | 2/2011 | Slinger et al. | 250/226 |
| 2002/0075990 A1 | 6/2002 | Lanza et al. | |
| 2003/0058520 A1 | 3/2003 | Yu et al. | |
| 2003/0122955 A1 | 7/2003 | Neidrich | |
| 2003/0164814 A1 | 9/2003 | Starkweather et al. | |
| 2003/0191394 A1 | 10/2003 | Simon et al. | |
| 2004/0008397 A1 | 1/2004 | Noonan | |
| 2004/0046123 A1 | 3/2004 | Dausch | |
| 2005/0057793 A1 | 3/2005 | Starkweather et al. | |
| 2005/0248827 A1 | 11/2005 | Starkweather et al. | |
| 2006/0038705 A1 | 2/2006 | Brady et al. | |
| 2006/0157640 A1 | 7/2006 | Perlman et al. | |
| 2007/0013999 A1 | 1/2007 | Marks et al. | |
| 2007/0091051 A1 | 4/2007 | Shen | |
| 2007/0263914 A1 * | 11/2007 | Tibbetts | 382/129 |
| 2008/0128625 A1 | 6/2008 | Lamadie et al. | |
| 2008/0151391 A1 | 6/2008 | Zalevsky et al. | |
| 2008/0240535 A1 * | 10/2008 | Frangioni et al. | 382/131 |
| 2008/0259354 A1 | 10/2008 | Gharib et al. | |
| 2008/0285034 A1 | 11/2008 | Gharib et al. | |
| 2009/0008565 A1 | 1/2009 | Gottesman | |
| 2009/0020714 A1 | 1/2009 | Slinger | |
| 2009/0022410 A1 | 1/2009 | Haskell | |
| 2009/0090868 A1 | 4/2009 | Payne | |
| 2009/0167922 A1 | 7/2009 | Perlman et al. | |

FOREIGN PATENT DOCUMENTS

| | | |
|---|---|---|
| EP | 0 318 249 A2 | 5/1989 |
| EP | 0 663 763 A2 | 7/1995 |
| EP | 1 341 025 A1 | 9/2003 |
| EP | 1 491 958 A2 | 12/2004 |
| EP | 1 494 046 A1 | 1/2005 |
| EP | 1 627 526 | 2/2006 |
| GB | 1 449 636 | 9/1976 |
| GB | 2314664 | 1/1998 |
| GB | 2 350 472 | 11/2000 |
| GB | 2 414 881 A | 12/2005 |
| GB | 2 418 028 A | 3/2006 |
| GB | 2 434 935 A | 8/2007 |
| JP | A-55-146411 | 11/1980 |
| JP | A-58-060723 | 4/1983 |
| JP | A-04-005620 | 1/1992 |
| JP | A-09-113819 | 5/1997 |
| JP | A-2001-218116 | 8/2001 |
| JP | A-2003-4441 | 1/2003 |
| JP | A-2005-202225 | 7/2005 |
| WO | WO 91/12502 A1 | 8/1991 |
| WO | WO 94/18582 A1 | 8/1994 |
| WO | WO 96/24032 A1 | 8/1996 |
| WO | WO 97/26557 | 7/1997 |
| WO | WO 98/46007 A1 | 10/1998 |
| WO | WO 00/17810 | 3/2000 |
| WO | WO 00/45608 A1 | 8/2000 |
| WO | WO 02/44788 A1 | 6/2002 |
| WO | WO 02/056055 A2 | 7/2002 |
| WO | WO 02/056061 A2 | 7/2002 |
| WO | WO 03/017000 A1 | 2/2003 |
| WO | WO 2004/102958 A1 | 11/2004 |
| WO | WO 2006/125975 A1 | 11/2006 |
| WO | WO 2007/045875 A1 | 4/2007 |
| WO | WO 2007/047732 A2 | 4/2007 |
| WO | WO 2007/054769 A2 | 5/2007 |
| WO | WO 2007/091051 A1 | 8/2007 |
| WO | WO 2007/121417 A2 | 10/2007 |
| WO | WO 2008/108840 A1 | 9/2008 |
| WO | WO 2008/128625 A2 | 10/2008 |
| WO | WO 2008/142543 A1 | 11/2008 |

OTHER PUBLICATIONS

M. Bertero & P. Boccacci, "Introduction to Inverse Problems in Imaging," Institute of Physics Publishing, 1998, p. 106-113; 174-183; 288-294.

Feb. 25, 2011 Office Action issued in U.S. Appl. No. 12/278,470.

Meng et al. "A Gamma Ray Imager Using Clustered Non-Redundant Array Coded Aperture," 2003 IEEE Nuclear Science Symposium Conference Record, vol. 2 (Oct. 2003), pp. 763-766.

U.S. Appl. No. 60/792,335, filed Oct. 17, 2005 in the name of David Brady.

Mar. 29, 2010 Office Action issued in U.S. Appl. No. 12/278,470.

Bertero et al., "Image Restoration Methods for the Large Binocular Telescope (LBT)," Astronomy and Astrophysics, May 30, 2000, pp. 1-15.

Cannon et al., "Coded Aperture Imaging: Many Holes Make Light Work," Optical Engineering, May/Jun. 1980, vol. 19, No. 3, pp. 283-289, (XP-001092857).

De Villiers et al., "Sub-Pixel Super-Resolution by Decoding Frames from a Reconfigurable Coded-Aperture Camera: Theory and Experimental Verification," Proc. of SPIE, 2009, vol. 7468, pp. 746806-1 to 746806-9, (XP-002558345).

Gutin et al., "Agile, Detecting and Discriminating, infrared Electo-optical System (ADDIOS) Application to Coded Aperture Imaging and Non-Imaging Sensor Systems," Proc. of SPIE, 2007, vol. 6714, pp. 671406-1 to 671406-12, (XP-002558346).

Mohan et al., "Sensing Increased Image Resolution Using Aperture Masks," CVPR, 2008, pp. 1-8, (XP-31297391).

Slinger et al., "Coded Aperture Systems as Nonconventional, Lensless Imagers for the Visible and Infrared," Proc. of SPIE, 2007, vol. 6737, pp. 67370D-1 to 67370D-10, (XP-002558347).
Rocchia et al., "A Multiplex Imaging Spectrometer for Low Energy X-Ray Astronomy," Astrophysics and Space Science, Oct. 1983, vol. 96, No. 2, pp. 361-374.
Grindlay et al., "Optimizing Wide-Field Coded Aperture Imaging: Radial Mask Holes and Scanning," Proc. of SPIE, 2004, vol. 5168, No. 1, pp. 402-410, San Diego, CA, USA, Aug. 4-7, 2003.
Dec. 23, 2009 International Search Report issued in corresponding International Application No. PCT/GB2009/001870.
Mar. 5, 2010 International Search Report issued in corresponding International Application No. PCT/GB2009/002780.
Mar. 19, 2009 Office Action issued in corresponding Application No. GB0822281.2.
Feb. 23, 2010 Office Action issued in U.S. Appl. No. 12/278,528.
Mar. 11, 2010 Office Action issued in U.S. Appl. No. 12/278,521.
Nov. 18, 2009 Office Action issued in U.S. Appl. No. 11/920,345.
May 7, 2010 Office Action issued in U.S. Appl. No. 11/920,345.
Schaich et al., "Computer Vision for Detecting and Quantifying Gamma-Ray Sources in Coded-Aperture Images," Record of the Asilomar Conference on Signals, Systems and Computers, Oct. 30, 1994, vol. 1, Cont. 28, pp. 741-748, (XP 000533631).
Casasent et al., "Real-time deformation invariant optical pattern recognition using coordinate transformations," *Applied Optics*, Mar. 1, 1987, pp. 938-942, vol. 26, No. 5, Optical Society of America, (XP 000601745).
Gmar et al., "Development of Coded-Aperture Imaging With a Compact Gamma Camera," *IEEE Transactions on Nuclear Science*, Aug. 2004, pp. 1682-1687, vol. 51, No. 4, IEEE, (XP 002366988).
Mertz et al., "Fresnel Transformations of Images," *Proceedings of the Conference on Optical Instruments and Techniques*, London 1961, Ed. K.J. Habel, 1961, pp. 305-312, (XP 002432814).
Graziani et al., "Localization of GRBs by Bayesian Analysis of Data from the HETE WXM," AIP Conference Proceedings AIP USA, 2003, No. 662, (XP 002467862).
Graziani et al., "Determination of X-Ray Transient Source Positions by Bayesian Analysis of Coded Aperture Data," Oct. 8, 1997, pp. 1-6, (XP 002467863).
Gopinathan et al., "Coded apertures for efficient pyroelectric motion tracking," *Optics Express*, Sep. 8, 2003, vol. 11, No. 18, pp. 2142-2152, (XP 002467864).
Goossen et al., "Silicon Modulator Based on Mechanically-Active Anti-Reflection Layer with 1 Mbit/sec Capability for Fiber-in-the-loop Applications," *IEEE: Photonics Technology Letters*, Sep. 1994, pp. 1119-1121, vol. 6, No. 9, IEEE, (XP 000468079).
Monnelly et al., "HETE Soft X-ray Camera Imaging: Calibration, Performance, and Sensitivity," *AIP Conference Proc.*, 2003, pp. 49-55, American Institute of Physics.
Wood et al., "Hybrid optics in dual waveband infrared systems," *Proc of SPIE*, 1998, pp. 602-613, vol. 3482.
Fish et al., "Scanning singular-value-decomposition method for restoration of images with space-variant blur," *J. Opt. Soc. Am. A*, Mar. 1996, pp. 464-469, vol. 13, No. 3, Optical Society of America.
Lewis et al., "Micromachined Modulator Arrays for Use in Free-Space Optical Communication Systems," *Advanced Free-Space Optical Communications Techniques and Technologies, Proc of. SPIE*, vol. 5614, pp. 24-30, 2004.
Moseley et al., "Microsbutters Arrays for the JWST Near Infrared Spectrograph," *Proceedings SPIE, International Society for Optical Engineering*, 2004, vol. 5487, Part 2, pp. 645-652.

Kutyrev et al., "Programmable Microshutter Arrays for the JWST NIRSpec: Optical Performance," *IEEE Journal of Selected Topics in Quantum Electronics*, May/Jun. 2004, vol. 10, No. 3, pp. 652-661.
De Villiers et al.; "Positive solutions to linear inverse problems," *Inverse Problems*, 1999, pp. 615-635, vol. 15, IOP Publishing Ltd.
U.S. Appl. No. 60/726,655, filed Oct. 17, 2005 in the name of David Brady.
U.S. Appl. No. 12/278,528, filed Aug. 6, 2008 in the name of Douglas Payne.
U.S. Appl. No. 12/278,470, filed Aug. 6, 2008 in the name of Christopher Slinger.
U.S. Appl. No. 12/278,500, filed Aug. 6, 2008 in the name of Mark McNie et al.
U.S. Appl. No. 12/278,521, filed Aug. 6, 2008 in the name of Christopher Slinger.
U.S. Appl. No. 12/278,524, filed Aug. 6, 2008 in the name of Christopher Slinger et al.
U.S. Appl. No. 12/373,946, filed Jan. 15, 2009 in the name of Malcolm Strens.
Fenimore et al.; "Coded aperture imaging with uniformly redundant arrays"; *Applied Optics*; Feb. 1, 1978; pp. 337-347; vol. 17, No. 3; Optical Society of America.
Cannon et al.; "Tomographical imaging using uniformly redundant arrays"; *Applied Optics*; Apr. 1, 1979; pp. 1052-1057; vol. 18, No. 7; Optical Society of America.
Busboom et al.; "Coded aperture imaging with multiple measurements"; *J. Opt. Soc. Am. A*; May 1997; pp. 1058-1065 vol. 14, No. 5; Optical Society of America.
Brown; "Multiplex imaging with multiple-pinhole cameras"; *Journal of Applied Physics*.; Apr. 1974; pp. 1806-1811; vol. 45, No. 4; American Institute of Physics.
Accorsi et al.; "High-Sensitivity Dynamic Coded Aperture Imaging"; *2003 IEEE Nuclear Science Symposium Conference Record*, vol. 5 of 5; Oct. 19, 2003; pp. 1833-1837; vol. 13.; IEEE.
Tam et al.; "Spatial-light-modulator-based electro-optical imaging system"; *Applied Optics*; Feb. 10, 1992; pp. 578-580; vol. 31, No. 5; Optical Society of America.
Sun et al.; "Method for reduction of background artifacts of images in scanning holography with a Fresnel-zone-plate coded aperture"; *Applied Optics*; Jul. 20, 2004; pp. 4214-4218; vol. 43, No. 21; Optical Society of America.
International Search Report for PCT/GB2006/001890 mailed Aug. 28, 2006.
GB Search Reports for Application No. 0510470.8 dated Aug. 16, 2005, Nov. 8, 2005 and Nov. 10, 2005.
Aug. 31, 2010 Office Action issued in U.S. Appl. No. 12/278,528.
Sep. 30, 2010 Office Action issued in U.S. Appl. No. 12/278,470.
Oct. 19, 2010 Office Action issued in U.S. Appl. No. 12/278,500.
Ivanov, O.P., "Control and image decoding software for portable gamma-ray imaging system with coded aperture", Oct. 1999, Nuclear Science Symposium 1999. Conference Record. 1999 IEEE, vol. 1, pp. 459-463.
Aug. 26, 2009 Office Action issued in U.S. Appl. No. 12/278,528.
Sep. 14, 2010 Office Action issued in Japanese Patent Application No. 2008-512909 (translation).
Japanese Office Action dated May 24, 2011 for Japanese Patent Application No. 2008-512909.
Jul. 19, 2011 Office Action issued in Japanese Patent Application No. 2008-552892.

* cited by examiner

METHOD AND APPARATUS FOR CODED APERTURE IMAGING

This invention relates to a method and apparatus for coded aperture imaging, especially to a method and apparatus using two or more different coded aperture arrays to sequentially image a scene.

Coded aperture imaging is a known imaging technique which is primarily used in high energy imaging such as X-ray or γ-ray imaging where suitable lens materials do not generally exist, see for instance E. Fenimore and T. M. Cannon, "Coded aperture imaging with uniformly redundant arrays", Applied Optics, Vol. 17, No. 3, pages 337-347, 1 Feb. 1978. It has also been proposed for three dimensional imaging, see for instance "Tomographical imaging using uniformly redundant arrays" Cannon T M, Fenimore E E, Applied Optics 18, no. 7, p. 1052-1057 (1979)

Coded aperture imaging exploits the same principles as a pinhole camera but instead of having a single small aperture uses a coded aperture mask having an array of apertures. The small size of the apertures results in a high angular resolution but increasing the number of apertures increases the radiation arriving at the detector thus increasing the signal to noise ratio. Each aperture passes an image of the scene to the detector array and so the pattern at the detector array is an overlapping series of images and is not instantly recognisable as the scene. Processing is needed to reconstruct the original scene image from the recorded data.

The reconstruction process requires knowledge of the aperture array used and system configuration and the aperture array chosen is often coded to allow subsequent good quality image reconstruction.

Bushboom et al. "Coded Aperture Imaging with Multiple Measurements"; J. Opt. soc. Am. A, Vol. 14, No. 5, p 1058, May 1997 describe coded aperture imaging techniques which image a scene with different coded aperture arrays. The use of a plurality of coded aperture arrays allows a set of arrays and decoding filters to be designed which has desirable properties.

Recently, see UK patent application WO2006/125975, it has been proposed to use a reconfigurable coded aperture mask means. The use of a reconfigurable coded aperture mask means allows different coded aperture masks to be displayed at different times. This allows, for example, the direction and field of view (FOV) of the imaging system to be altered without requiring any moving parts. For instance if a large coded aperture mask means is provided only part of it could be used to provide a coded aperture array, the rest of the mask means being opaque. Changing the position, relative to the detector, of the part of the mask means which provides the array changes the look direction of the apparatus. Further the resolution of the imaging system can also be altered by changing the coded aperture mask displayed on the coded aperture mask means.

The pattern displayed on the coded aperture mask means is referred to herein as a coded aperture mask. At least part of the coded aperture mask is a coded aperture array. That is either the whole pattern displayed on the mask means is a coded aperture array or, as described in more detail below, only part of the pattern is a coded aperture array. The skilled person will be well of aware of the coded aperture arrays that can be displayed. For the avoidance of doubt the term aperture used herein does not imply a physical hole in the mask means but merely an area of the pattern which allows radiation to reach the detector.

The reconfigurable coded aperture imager described therefore offers an imager with a very large depth of field, and which can change its look direction and/or resolution very quickly without any moving parts and is therefore advantageous for many applications.

The skilled person will appreciate however that coded aperture imaging involves a lot of computation to resolve the image. For high quality images a high resolution is needed which involves having detector arrays with large number of pixels (adding to the computational load). Further generally high resolution would require very small apertures and a reasonable distance between the mask and the detector array. At visible, ultraviolet or infrared wavelengths this can lead to diffraction effects degrading image quality. Further system requirements may put a practical limit on the mask detector spacing.

The present invention is therefore directed towards providing an apparatus and method for coded aperture imaging which has improved resolution and/or reduced computational load for given system parameters.

Thus according to the present invention there is provided a method of processing data from a coded aperture imaging apparatus comprising the step of taking a plurality of frames of data, each frame of data obtained using a different coded aperture array to image the scene, taking the plurality of aperture functions corresponding to the coded aperture arrays used to acquire the data, applying a weighting to each aperture function and applying the same weighting to the respective frame of data, combining the weighted aperture functions into a combined aperture function and combining the weighted frames of data into a combined frame of data.

The present invention therefore takes a number of frames of data of the scene using different coded aperture arrays. The different frames of data are then each assigned a weighting, i.e. effectively multiplied by a particular value, and combined into a single frame. As will be described later in more detail the combination of several snapshots can aid in increasing the resolution available from the data as opposed to processing a single frame of data.

Knowledge of the coded aperture array used in a coded aperture imaging system is needed in order to reconstruct the image from the data received at the detector array. As the present invention combines frames of data acquired using different coded aperture arrays the aperture functions describing each coded aperture array are also combined, using the same weightings, to form a single aperture function. The combined data and combined aperture function are then used to form a scene image.

The plurality of coded apertures used should comprise orthogonal random sets. Each array should be random such that each aperture in the array is statistically independent of all the others—the probability that a given pixel is open or not does not depend on any other pixel. The set of arrays should be orthogonal, i.e. uncorrelated, so that the probability of a given pixel being on or off in one array is independent of what state that pixel was in another array in the set. Within these parameters a variety of different coded aperture arrays may be used.

Preferably the weightings are arranged such that the sum of all of the weightings applied is zero. This results in what may be termed a balanced weighting system. As will be described later having a balanced weighting system means that certain assumption can be made which reduces the computation required to reconstruct an image.

The skilled person will appreciate that coded aperture imaging is an incoherent imaging technique and so contributions from each aperture in the array sum at the image plane. Having a balanced weighting system means that some parts of the signal data to be combined are allocated a negative weighting. This allows for cancellation, on average, of some terms which simplifies the processing and increases the resolution.

The weightings applied may simply be positive or negative values. However complex values could be used as well. Higher dimensional weightings could also be used. The weightings used can be chosen based on the number of frames of data and/or the processing requirement. As the choice of weighting can be made during the processing stage, i.e. after data acquisition, no advance choices need be made. It can be beneficial to choose weightings such that the weightings are equally spaced about the sum of the weightings—this can depend on the number of frames of data to be combined. In other words if there were four frames to be combined the weightings applied could be $+\frac{1}{4}, +\frac{1}{4}, -\frac{1}{4}, -\frac{1}{4}$. The sum of these weights is zero and each weight is spaced equally (i.e. as represented on a number line) from the sum point. This means that no frame is more greatly weighted than any other which benefits in noise reduction. Alternatively the weights could be complex and could be $+\frac{1}{4}, -\frac{1}{4}, +i/4$ and $-i/4$. Again these have a zero sum and each is spaced equally (i.e. as would be represented on an Argand diagram). Alternatively a three dimensional weighting could be used with the weightings forming the points of a tetrahedron in the three dimensional space. Higher dimensional weightings may therefore offer better noise reduction for higher numbers of frames.

In some instances it may be preferable to arrange the sum of the modulus of weightings applied to be equal to one so that the total energy in the combined data is the same as from an individual frame.

In order to reconstruct the image the method of the present invention effectively estimates the intensities of a series of trial points in the scene that would give the actual signal received. It is shown later that the intensity of each the trial points is given by the inverse of the covariance matrix of the trial points for the combined aperture function multiplied by the convolution of the combined frame data and the combined aperture function. The term covariance matrix is used herein to describe the matrix of the variances of the trial point signals. A term on the diagonal of the matrix represents the variance of a particular trial point signal and an off diagonal term is the covariance of one trial point signal with another. This matrix, which has the structure of a covariance matrix shall be referred to hereafter as the covariance matrix.

Thus the method of the present invention further comprises the step of forming a covariance matrix for the combined aperture function for a set of trial points. Further the method includes the step of convolving the combined frame data with the combined aperture function. The method further involves the step of inverting the covariance matrix and then multiplying it by the convolution integral.

It should be noted however that the covariance matrix is an m by m matrix where m is the number of trial points in the set. Obviously the number of trial points chosen partly determines the resolution in the reconstructed scene image and a large number is preferred for high quality images. The resolution achievable by the imager is dictated by the size of the apertures in the coded aperture array and the distance between the coded aperture and the detector array—the basic resolution is the stereo angle subtended by the aperture at that particular distance. A high resolution imager has a coded aperture array with a large number of relatively small apertures. The number of trial points that can sensibly be chosen is determined by the number of pixels, i.e. apertures or non-apertures, in the coded aperture array (assuming that the detector array has a sufficient number of pixels itself). If the coded aperture array has one million pixels the number of trial points may be chosen to match i.e. one million. In this case the covariance matrix would be a 1 million by 1 million matrix. Greater numbers of trial points would generate even large matrices. The calculation and inversion of such a large matrix is a significant mathematical task and would involve significant processing overhead.

For a high resolution coded aperture imager forming and inverting a covariance matrix is therefore a significant task and is usually avoided. The present invention however forms the covariance matrix based on the combined aperture function. Appropriate choice of weightings reduces the value of some terms in the matrix thus making the inversion task easier. When a balanced weighting scheme is used, i.e. the sum of the applied weights is zero, it can be shown that, on average, the terms of the covariance matrix which correspond to widely spaced trial points is zero. In fact it will be shown that outside the trial point overlap region each term of the covariance matrix is, on average zero.

A trial point, say the $i^{th}$ point, is said to overlap with another trial point, say the $j^{th}$ point if a point source located at the $i^{th}$ point would illuminate, through any given aperture, part of the detector array also illuminated through that same aperture by a point source located at the $j^{th}$ point.

If the trial points are widely spaced, for the size of the pixels of the coded aperture array, then no trial point will overlap with another. In this case the average value of the terms of the covariance matrix arising from the convolution of one trial point with another is zero. Thus it can be assumed that the only terms of the matrix with a non zero value are those corresponding to the convolution of a trial point with itself. In other words the covariance matrix can be assumed to be diagonal. This obviously offers a huge simplification in inverting the matrix.

Where there is overlap between closely spaced trial points one can still assume that each term not corresponding to one of the overlap points is zero and thus the matrix is effectively a thick diagonal.

Thus the step of forming the covariance matrix involves the step of making each term of the matrix zero outside of the trial point overlap region.

The balanced weighting method of the present invention therefore allows a covariance matrix to be formed which is zero outside the overlap region which means even high resolution images can be reconstructed using this method. Further it should be noted that the present invention provides a way of determining the intensity at trial points that overlap in the coded aperture array. In other words the resolution of the reconstructed image can be improved over one pixel per pixel of the coded aperture array.

It should be noted that the method of the present invention is quite different to the method proposed by Bushboom et al. in the paper mentioned above. The technique described in Bushboom et al. applies a decoding filter to each frame of data rather than producing a composite data frame and a composite aperture function. Further the decoding method proposed does not form a covariance matrix nor invert such a matrix. Also there is no mention of using a balanced weighting approach where the sum of the weightings applied must be zero. The present invention composites the frame data and aperture functions, preferably using a balanced weighting. Forming a covariance matrix is then possible which can be practically inverted to give an image with improved resolution and signal to noise ratio over conventional decoding techniques.

The number of frames of data combined will depend on a number of factors. In theory the noise of the system is reduced the more frames of data that are combined. In the ideal case noise in the final image reduces by a factor of the square root of the number of frames acquired. However in practical systems there may be a limit to the number of frames of data that can usefully be combined. Non linearity of the detector array may mean that there is a limit to how much noise reduction can be achieved. The amount of computation needed to composite the frames also increases with a greater number of frames. This is not a great issue where the weightings have real values or are of low dimensionality. However higher dimensional weightings involve increasing amounts of calculation.

Also when imaging with movement of the scene relative to the detector and/or movement within the scene frames of data acquired at different times will correspond to different scenes. Obviously if the frames of data represent significantly different scenes it will not be possible to combine the frames of data and recover a single clear scene image. Therefore conveniently each frame of data should be correspond to the same scene, i.e. the detector position and orientation relative to the scene is substantially the same at the time the different frames of data are acquired and that there has been no significant motion within a majority of the scene.

Therefore data acquired from a static CAI apparatus of a non-moving scene could clearly be combined in the method of the present invention. Where the CAI apparatus is moving with respect the scene, for instance in a scanned system, the frames of data could be those acquired within a short enough period that there is insignificant apparent motion of the scene and thus all frames of data within that period of are the same scene. Alternatively for a fixed scan pattern relative to a scene the frames could be acquired at the same point in the scan cycle.

Where there is a slight change in the scene between frames of data, such as may be acquired by successive frames taken by a scanning CAI imager with a longer interval the method may involve the step, prior to combining the frames of data, of adjusting at least some of the frames to account for relative motion with respect to the scene. The adjustment to the frames of data may be based on a model of the relative motion when the frames are acquired. If the CAI imager is mounted on a moving platform the movement of the imager may be monitored in order to construct a model of the relative motion of the scene for each frame of acquired. The effects of such motion can then be compensated by an appropriate adjustment to the data frames. Alternatively the relative motion may be modelling how the frames of data may be effected by relative motion and use cross correlation to work out the relative motion between successive frames. The method may involve taking at least two frames of data that were acquired using the same coded aperture array but at different times and comparing the two frames of data to determine any relative motion. Obviously if the scene is static the two frames of data should be substantially the same. However if some or all of the scene has changed the data recorded by the detector array will also have changed. This can be used as a simple way of determining that the scene has changed and even whether just an area of the scene has changed. Further the differences between the two frames of data can be used to determine and account for any relative scene motion.

Once the relative motion has been determined the frames of data can be adjusted, conveniently in a real time system the frames are adjusted so that the scene view is that of the most recently captured frame.

After adjusting for any relative motion a weighting can be applied to the adjusted frames and the weighted frames combined. The weightings can be chosen so that the most recent image has the strongest weighting, for instance the weightings applied could be an exponentially decaying sum backward in time. A convenient way to apply such a weighting series is to take a plurality of snapshots and form a composite frame of data as described above. This composite can be formed using the balanced weights approach described. It is then combined with a previously formed composite frame of data with each composite frame being given a time series weighting. The time series weightings should be fractions of the same sign and sum to one. The relative weighting of the present composite frame to the previous composite frame obviously determines the weighting given to the historical data in the combination. For instance a weighting of ½ applied to each composite frame gives a greater weight to the historical data than a weighting of ⅔ applied to the current composite frame and ⅓ to the previous composite frame. A similar combination is performed on the aperture functions.

The time series composite can then be processed to form a current image in exactly the same way as described previously. Note that if a balanced weight approach is used as each composite is balanced the time series composite is also balanced.

The time series composited frame data and aperture function are then stored as the previous composite frame and aperture data. A new plurality of frames can then be acquired and composited, given a time series weighting and combined with the stored previous composite frame. In this way the current composite needs only be combined with one previous composite which contains contributions from all previous composites.

This therefore provides a computionally easy way of forming a decaying time series without requiring large amounts of data to be stored. However other methods of forming the decaying time series are possible, for instance data from each individual frame could be stored and given a new weighting for each combination or a frame could be added one at a time through use of an appropriate choice of weightings.

Obviously correcting for motion in several frames of data involves additional processing over and above that which would be involved with forming an image from the most recent frame only. However the advantages of frame combination with respect to noise reduction, reduction of image reconstruction processing and increased resolution mean that overall the present invention still has significant advantage even for relatively fast moving imagers.

If only part of the scene changes between frames of data it can be difficult to correct just that part of the scene. For some applications the fact that part of the scene is changing may not be important. Several frames of data could still be combined using the method of the present invention (correcting for any bulk relative motion as necessary) and thus any parts of the scene which were substantially unchanged over the period of frame acquisition (corrected for bulk motion) would result in a sharp image being formed whereas areas of significant movement would be blurred, in a manner similar to a long exposure of a conventional camera.

As mentioned the comparison of two frames of data acquired using the same coded aperture array but at different times could be used to highlight any areas of motion in the scene. In a real time imager this could be used to highlight areas of the movement within the scene.

In one embodiment of the invention the detector array may be used to composite at least some of the frames of data into a single frame. As the skilled person will appreciate the detector array will generally integrate the intensity signal received over a certain time period. If several different coded aperture arrays are displayed during one integration period of the detector array the resultant output from the detector array will be the summed signal of the intensity received from each coded aperture array. The relative duration that a particular array is exposed determines its weighting. Thus a plurality of different coded aperture arrays could be exposed during the integration period of the detector array and the step of combining the frames of data could be performed by the detector array. This relies on a certain degree of linearity of the detector array. Further it is not possible to apply negative weightings through varying the exposure time. However a series of n coded aperture arrays could be exposed for equal times during the integration period of the detector array and the output recorded, a further series of n arrays could then be exposed for the same equal times during a second integration period. The output from the first period could be subtracted from the second to provide a balanced weighting (and divided by two to ensure no energy gain) to provide a final composite frame. The aperture functions of all of the arrays would then have to be composited using appropriate weightings.

The method of the first aspect of the invention therefore provides a method which allows for a drastic simplification in the computation required to invert the covariance matrix and thus decode the image with a good signal to noise ratio. Another way of reducing the computation required to invert the covariance matrix is to partition the matrix through use of tiles or a set of tilings. A tile is defined herein as an aperture function that consists of a continuous region which is transmissive (or reflective) which is bordered by a region which is opaque, in other words were the coded aperture array to have the aperture function of a tile it would be an area of transmissive pixels bordered by a region on non transmissive pixels.

If a tile function is imposed on a coded aperture array, i.e. the coded aperture array is used as normal but with all pixels outside of the tile area set to zero then only a portion of the whole coded aperture array is exposed. In effect the field of view of the imager is reduced. This reduces the number of trial points in the estimation and hence makes the calculation of the covariance matrix easier—in effect it partitions the covariance matrix.

One could then use a set of tiles that exactly tessellate over the coded aperture mask to produce a series of small images which together will form the large image. However it may be advantageous to acquire frames of data using a fractal tile sequence. These frames can then be composited to form a single equivalent tile. The advantage of using a fractal tile sequence is that the overlap zone between the equivalent tiles can be reduced as compared to just using one tile having the shape of the equivalent tile. The overlap zone effects how well the image in this areas can be reconstructed and so it is advantageous to reduce this if possible.

One or more tiles could be used as aperture codings on their own. For instance a set of snapshots of the scene could be taken of a scene using a plurality of coded aperture arrays having a tile function imposed. One snapshot of the scene using just a tile coding could then be acquired. The frames acquired from the plurality of coding arrays could be given equal positive weights and the frame acquired with just the tile coding given a negative weight. The frames could then be composited together as described above.

The method of the present invention may therefore comprise acquiring at least one frame of data using a tile coding. The tile coding may comprise the aperture function of the mask or it may be imposed on a random coded aperture array so that the mask has a combined aperture function.

Dynamic imaging may make use of tiles. For instance random sets of tiles could be used to quickly generate an outline image. From this areas of interest could be identified and further snapshots of just those areas acquired for processing. Those areas of interest could be an area where a target of interest has been detected. Alternatively for scenes having movement therein the areas of interest could be where the scene has changed. An full image of a scene could be acquired by taking several snapshots of a field of view using separate tiles and the image reconstructed. Subsequently to asses whether there has been any movement successive snapshots of a tile could be taken and compared to see if anything has changed in that tile. If there is no change in that tile there is no need to do any further processing. Only if there has been any change in the tile is there a need to take further snapshots with coded arrays and process to construct the new image.

Thus the use of tiles can allow rapid identification of areas of change for concentration of processing resource. This can also inherently offer data compression as only data relating to areas in the scene that have changed need to be stored/communicated. Therefore the method of imaging the scene may comprise the step of forming a first combined frame of data for one part of the scene at a first time and subsequently forming a second combined frame of data for the same part of the scene and comparing the combined frames of data to determine any motion in the scene. Combined frames of data are compared for substantially the whole of an area of interest within the scene which may the whole of the field of view or an area where a target or object of interest has been identified. Image processing is concentrated on those areas of the scene where motion in the scene is detected. Image processing is taken to mean the processing of the frame to generate image data and also the acquisition of more frames of data, perhaps at a higher resolution, of the areas where motion occurs.

The present invention provides a method of processing multiple frames of data acquired from a coded aperture imaging system to improve resolution and/or reduce the processing required to form an image. When used to process the data from a coded aperture imager such as described in WO2006/125975 which has a reconfigurable coded aperture array this can provide a good quality real time imager. In such an application the number of frames of data and interval between them can be varied dynamically.

Thus in another aspect of the invention there is provided a method of coded aperture imaging comprising the step of imaging a scene with coded aperture imager, acquiring several frames of data, each frame of data being acquired using a different coded aperture array and processing the frames of data in accordance with the method of the first aspect of the invention.

The method preferably involves using a coded aperture imager having a reconfigurable coded aperture array means and the method comprises successively reconfiguring the coded aperture array means to provide a plurality of different coded aperture arrays and recording a frame of data for each coded aperture array.

In another aspect of the invention there is provided a coded aperture imager comprising a detector array arranged to receive radiation from a scene through a reconfigurable coded aperture array means, wherein the reconfigurable coded aperture array means is adapted to successively provide a plurality of different coded aperture arrays further comprising a processor adapted to process the output from the detector array using the method of the first invention.

The invention will now be described by way of example only with respect to the following drawings of which.

Figure 1:
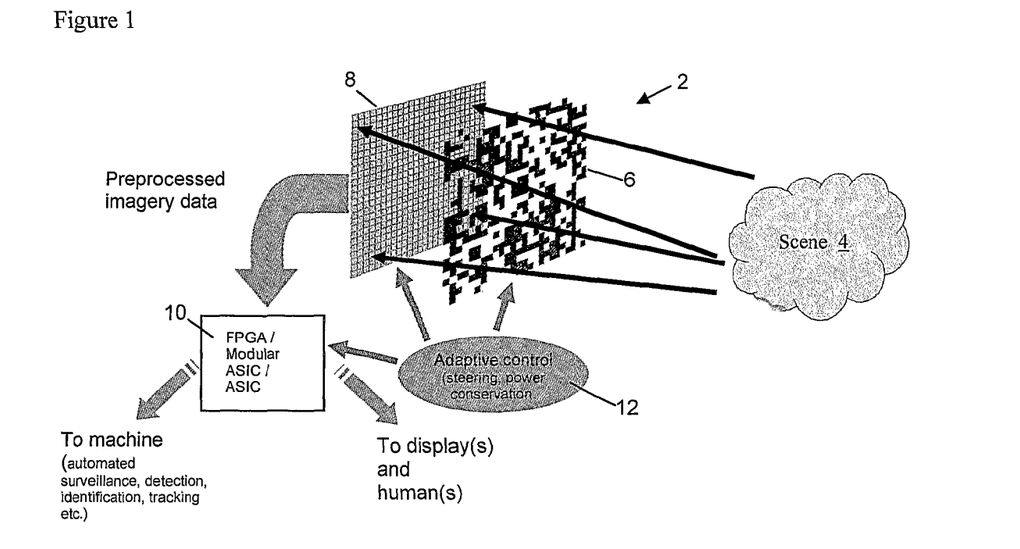
FIG. 1 shows a schematic of a coded aperture imaging system.

FIG. 1 shows schematically an example of a coded aperture imaging system, generally indicated 2. Rays of light from points in the scene 4 fall onto a particular coded aperture array 6. The coded aperture array acts as a shadow mask and therefore a series of overlapping coded images are produced on the detector array 8. At each pixel on the detector array, the intensities from the overlapping, coded images are summed. The output from the detector array 8 is passed to a processor 10 where image of the scene can be subsequently decoded from the detector signals using a variety of digital signal processing techniques.

Recently WO2006/125975 has proposed using a reconfigurable mask means 6 to provide reconfigurable coded aperture array. The coded aperture mask means 6 is controlled by a controller 12 which controls the reconfigurable mask means to display different coded aperture masks. If only part of the coded aperture mask means displays a coded aperture array, the rest of the mask preventing radiation from reaching the detector, then the field of view of the apparatus is determined by the location and size of the coded aperture array relative to the detector, changing its position or size changes the field of view and/or resolution of the imager.

CAI therefore offers the ability to provide a compact and lightweight imaging apparatus which has a large depth of field and has a changeable field of view without requiring any moving parts.

Figure 2:
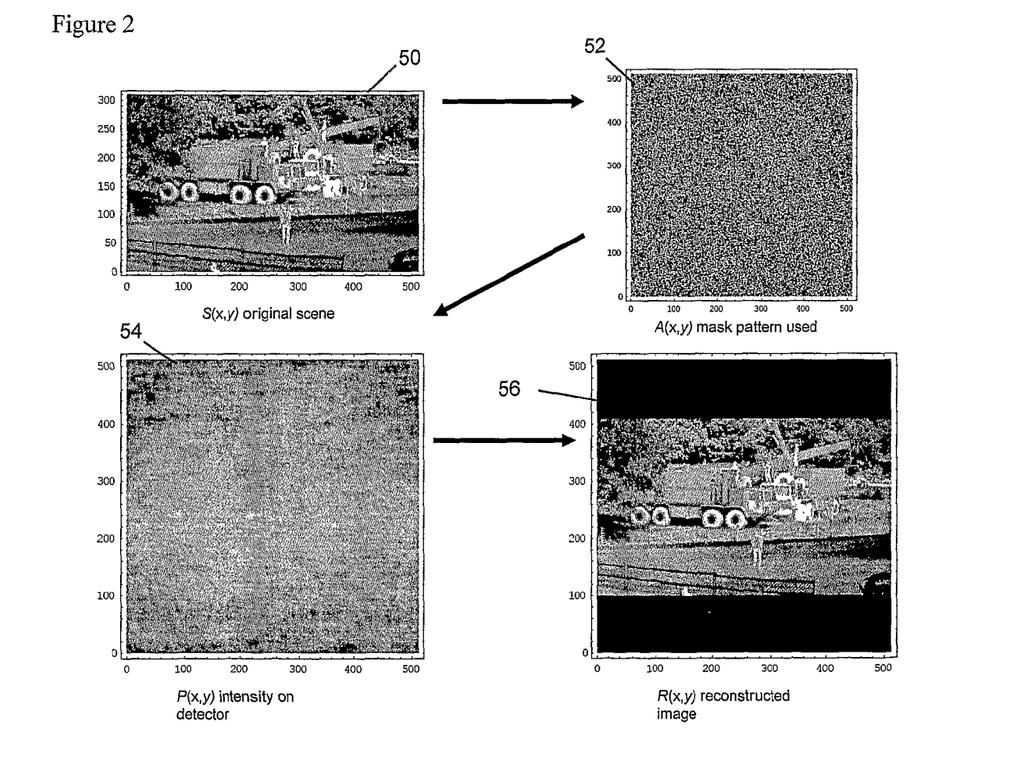
FIG. 2 shows a sample scene, a coded aperture array, detector pattern intensity and the reconstructed image.

As mentioned above the intensity pattern formed at the detector array 8 is a series of overlapping images of the scene created by the various apertures. This intensity pattern requires decoding to construct a recognisable image of the scene. FIG. 2 illustrates a scene image 52, the coded aperture array used 54 and the resultant pixel intensity at the detector array 56. Only after suitable processing is the image recovered 58.

There are a variety of CAI decoding algorithms already available in the prior art, the majority of which have been developed for off line decoding involving the relatively low pixel count detectors associated with X-ray, g-ray and radiological imaging. For real time decoding applications, factors to be considered when choosing appropriate algorithms include optimisation with signal-to-noise characteristics of the detectors to be used, mask types, synergy with efficient decoding computer architectures and adaptability to support a variety of performance options.

The decoding step can be performed by making a model of the scene, comparing the model of the scene to the actual signal received and adjusting the model to compensate for any error between the modelled signal intensity and the actual signal intensity. In making the model it is assumed that there are a plurality of point sources in the scene at different points and of differing intensities. The contribution from this series of points is then determined.

The process of forming a model of a series of points will be described but first some notation and basic concepts will be set out for clarity.

Basics and Functional Notation

Figure 3:
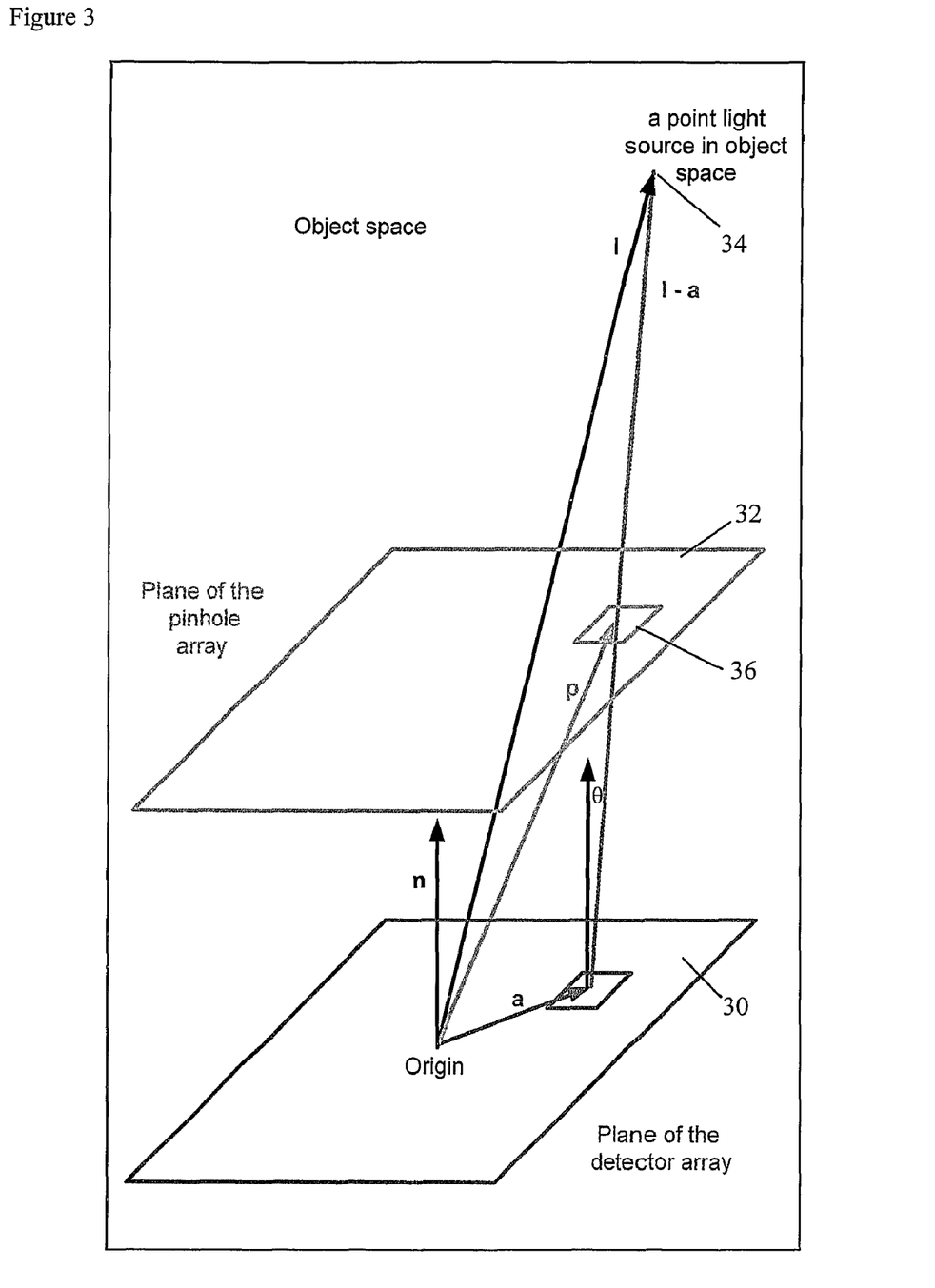
FIG. 3 illustrates system geometry.

FIG. 3 shows a representation of a coded aperture system with object space towards the top of the diagram. The plane of the detector array 30 is shown as horizontal. A vector a describes a position in the plane of the array and n is the unit vector normal to the plane of the detector array. Note that a.n=0 and the origin is taken as the centre of the detector array. In Cartesian terms the detector array is in the x-y plane and the z axis extends towards the scene.

The coded aperture array 32 is located at a height h above the detector array and is parallel thereto. p describes a position in the coded aperture array. The coded aperture array has an aperture, or transparency, function T(p) [or T(x, y, h)–often shortened to T(x, y) or T($x_p$, $y_p$) in Cartesian form]. The aperture or transparency function effectively defines the coded aperture array. T(p)=0 where the coded aperture array is opaque and no light can pass through and T(p)=1 at an aperture and light can pass (note the coded aperture array does not have to actually consist of apertures and reflective coded aperture masks can be envisaged—however for the purposes of the explanation the concept of a transmissive aperture mask will be described for now).

l is the location of a point 34 in the scene. Light from a point source in the scene travels in straight lines and the vector l–a describes one such ray of light that passes through an aperture 36 at p to reach the detector array at a. The signal density function, i.e. the signal across the detector array is S(a) [Again S(x, y, 0) or S(x, y) or S($x_a$, $y_a$) in Cartesian].

Where there is more than one source it will be necessary to distinguish the signal density function across the detector array arising from each source, thus S(a, $l_j$) is the signal from the jth source, or more simply $S_j$.

A signal of unit intensity is denoted by $\hat{S}(a)$.

Referring again to FIG. 3 imagine that the source 34 located at l emits J joules of energy. The light travels from the point l to a on the detector array, a path length of |l–a| The transparency of the coded aperture array at p is T(p). By similar triangles however;

$$p = a + \frac{h}{l \cdot n}(l - a) \qquad \text{Eqn (1)}$$

The light ray is at an angle θ to the normal vector of the detector array;

$$\cos\theta = \frac{n \cdot (l - a)}{|l - a|} \qquad \text{Eqn (2)}$$

Therefore, given the light from the point source effectively spreads uniformly about the surface of a sphere of radius |l–a| (the inverse square law), the energy per unit area arriving normal to the detector array at a point a is;

$$S(a) = J\cos\theta\left(\frac{1}{4\pi|l - a|^2}\right)T\left(a + \frac{h}{l \cdot n}(l - a)\right) \qquad \text{Eqn (3)}$$

or, rewriting using equation (2)

$$S(a) = J\left(\frac{n \cdot (l - a)}{4\pi|l - a|^3}\right)T\left(a + \frac{h}{l \cdot n}(l - a)\right) \qquad \text{Eqn (4)}$$

The expression K will be defined as follows as a substitution for a recurring term;

$$K = \left(\frac{n \cdot (l - a)}{4\pi|l - a|^3}\right) \qquad \text{Eqn (5)}$$

The signal density from a point of unit intensity $\hat{S}(a)$ can therefore be seen to be;

$$\hat{S} = KT\left(a + \frac{h}{l \cdot n}(l - a)\right) \quad \text{Eqn (6)}$$

It will sometime be require to determine the average signal density across the signal array (which is taken to be a square array of side 2a with a total area of A or $4a^2$). The average signal density will be denoted by $\bar{S}$;

$$\bar{S} = \frac{1}{A}\int S\,da = \frac{1}{4a^2}\int_{-a}^{a}\int_{-a}^{a} S\,dx\,dy \quad \text{Eqn (7)}$$

A zero mean density function is denoted by S';

$$S' = S - \hat{S} \quad \text{Eqn (8)}$$

It is also worth defining the variance of the signal density function and the covariance of two functions. The variance is;

$$\sigma_S^2 = \overline{S^2} - \hat{S} \quad \text{Eqn (9)}$$

And the covariance of two signal density functions, F and G is $$\sigma_{FG} = \overline{F'G'} = \overline{(F - \hat{F})(G - \hat{G})} \quad \text{Eqn (10)}$$

Finally the dot product of two signal density functions is defined as follows;

$$S_1 \cdot S_2 = \frac{1}{4a^2}\int_{-a}^{a}\int_{-a}^{a} S_1 S_2\, dx_a\, dy_a \quad \text{Eqn (11)}$$

Note that $$S_1 \cdot S_2 = \overline{S_1 S_2} = \sigma_{S_1 S_2} + \mu_{S_1}\mu_{S_2} \quad \text{Eqn (12)}$$

where $\mu$ is the mean.

The dot product of the signals $S_1$ and $S_2$ from point sources at locations $J_1$ and $J_2$ at locations $I_1$ and $I_2$ respectively is given by;

$$S_1 \cdot S_2 = J_1 J_2 K_1 K_2 \frac{1}{4a^2} \quad \text{Eqn (13)}$$

$$\int_{-a}^{a}\int_{-a}^{a} T\left(a + \frac{h}{l_1 \cdot n}(l_1 - a)\right)T\left(a + \frac{h}{l_2 \cdot n}(l_2 - a)\right)dx_a\,dy_a$$

Note that this works out to be $J_1 J_2 K_1 K_2$ multiplied by the proportion of the detector array which is illuminated by both point sources.

Modelling a Series of m Points

One way of reconstructing the scene image is to think of it as a series of point sources in the scene, each of which has a particular intensity. The idea is to estimate the set of light intensities $\{I_i\}$ arising from m points, of intensity $\alpha_i'$ located at locations $\{I_i\}$.

The total signal on the detector can be modelled as the sum of the signal from each point source plus some error, $\epsilon$;

$$S = \sum_{i=1}^{m}\alpha_i \hat{S}_i + \varepsilon \quad \text{Eqn (14)}$$

The error can therefore be written as;

$$\varepsilon = S - \sum_{i=1}^{m}\alpha_i \hat{S}_i \quad \text{Eqn (15)}$$

Obviously the error should be as small as possible. We therefore find the minimum error by least squares;

$$\varepsilon \cdot \varepsilon = \left(S - \sum_{i=1}^{m}\alpha_i\hat{S}_i\right)\cdot\left(S - \sum_{i=1}^{m}\alpha_i\hat{S}_i\right) \quad \text{Eqn (16)}$$

$$= S \cdot S - 2S \cdot \left(\sum_{i=1}^{m}\alpha_i\hat{S}_i\right) + \left(\sum_{i=1}^{m}\alpha_i\hat{S}_i\right)\cdot\left(\sum_{i=1}^{m}\alpha_i\hat{S}_i\right)$$

$$= S \cdot S - 2S \cdot \sum_{i=1}^{m}\alpha_i\hat{S}_i + \sum_{i=1}^{m}\sum_{j=1}^{m}\alpha_i\alpha_j\hat{S}_i\cdot\hat{S}_j$$

At a minimum $$\frac{\partial \varepsilon \cdot \varepsilon}{\partial \alpha_i} = -2\hat{S}_i + S + \sum_{j=1}^{m}2\alpha_j\hat{S}_i\cdot\hat{S}_j = 0 \quad \text{Eqn (17)}$$

for all i. This leads to the matrix equation $$\begin{pmatrix} S \cdot \hat{S}_1 \\ \vdots \\ S \cdot \hat{S}_i \\ \vdots \\ S \cdot \hat{S}_m \end{pmatrix} = \begin{pmatrix} \hat{S}_1 \cdot \hat{S}_1 & \cdots & \hat{S}_1 \cdot \hat{S}_i & \cdots & \hat{S}_1 \cdot \hat{S}_m \\ \vdots & \ddots & \vdots & \cdot^{\cdot^{\cdot}} & \vdots \\ \hat{S}_i \cdot \hat{S}_1 & \cdots & \hat{S}_i \cdot \hat{S}_i & \cdots & \hat{S}_i \cdot \hat{S}_m \\ \vdots & \cdot^{\cdot^{\cdot}} & \vdots & \ddots & \vdots \\ \hat{S}_m \cdot \hat{S}_1 & \cdots & \hat{S}_m \cdot \hat{S}_i & \cdots & \hat{S}_m \cdot \hat{S}_m \end{pmatrix}\begin{pmatrix} \alpha_1 \\ \vdots \\ \alpha_i \\ \vdots \\ \alpha_m \end{pmatrix} \quad \text{Eqn (18)}$$

Note that $$\hat{S}_i \cdot \hat{S}_j = \sigma_{\hat{S}_i\hat{S}_j} + \mu_{\hat{S}_i}\mu_{\hat{S}_j} \quad \text{Eqn (19)}$$

and hence $$\begin{pmatrix} I_1 \\ \vdots \\ I_i \\ \vdots \\ I_m \end{pmatrix} = \begin{pmatrix} \sigma_{\hat{S}_1\hat{S}_1} + \mu_{\hat{S}_1}\mu_{\hat{S}_1} & \cdots & \sigma_{\hat{S}_1\hat{S}_i} + \mu_{\hat{S}_1}\mu_{\hat{S}_i} & \cdots & \sigma_{\hat{S}_1\hat{S}_m} + \mu_{\hat{S}_1}\mu_{\hat{S}_m} \\ \vdots & \ddots & \vdots & \cdot^{\cdot^{\cdot}} & \vdots \\ \sigma_{\hat{S}_i\hat{S}_1} + \mu_{\hat{S}_i}\mu_{\hat{S}_1} & \cdots & \sigma_{\hat{S}_i\hat{S}_i} + \mu_{\hat{S}_i}\mu_{\hat{S}_i} & \cdots & \sigma_{\hat{S}_i\hat{S}_m} + \mu_{\hat{S}_i}\mu_{\hat{S}_m} \\ \vdots & \cdot^{\cdot^{\cdot}} & \vdots & \ddots & \vdots \\ \sigma_{\hat{S}_m\hat{S}_1} + \mu_{\hat{S}_m}\mu_{\hat{S}_1} & \cdots & \sigma_{\hat{S}_m\hat{S}_i} + \mu_{\hat{S}_m}\mu_{\hat{S}_i} & \cdots & \sigma_{\hat{S}_m\hat{S}_m} + \mu_{\hat{S}_m}\mu_{\hat{S}_m} \end{pmatrix}^{-1}\begin{pmatrix} \sigma_{S\hat{S}_1} + \mu_S\mu_{\hat{S}_1} \\ \vdots \\ \sigma_{S\hat{S}_i} + \mu_S\mu_{\hat{S}_i} \\ \vdots \\ \sigma_{S\hat{S}_m} + \mu_S\mu_{\hat{S}_m} \end{pmatrix} \quad \text{Eqn (20)}$$

The intensities of the trial points are therefore given by $$[I_i] = \frac{\lfloor \sigma_{S\hat{S}_i} + \mu_S \mu_{\hat{S}_i} \rfloor}{\lfloor \sigma_{\hat{S}_i \hat{S}_j} + \mu_{\hat{S}_i} \mu_{\hat{S}_j} \rfloor} \quad \text{Eqn (21)}$$

The numerator of this equation is the convolution integral formed from the cross correlation of the actual signal, S, and the transparency function at $I_i$ scaled for the inverse square law and boresight angle.

The denominator is the convolution integral formed from the cross correlation of the of the transparency functions at $I_i$ and $I_j$ scaled for the inverse square law and boresight angle of each. This is also known as the covariance matrix.

Calculating the covariance matrix, inverting it and multiplying by the convolution integrals is a large mathematical task which would take significant processing, especially as m, the number of trial points or resolution of the scene, grows as the covariance is an m by m matrix.

The present invention takes multiple snapshots, applies a weight to each snapshot and composites the snapshots together to an equivalent. This allows certain assumptions to be made which makes inverting the covariance matrix a great deal easier.

Multiple Snapshot Imaging

The present invention involves imaging the scene with more than one coded aperture array. Generally this will be done by imaging the scene sequentially with a plurality of different coded aperture arrays and recording the detector signal for each particular array. The reconfigurable coded aperture imaging system described in WO2006/125975 is particularly suitable for taking several snapshots of the scene using different coded aperture arrays.

The different coded aperture arrays used are preferably orthogonal.

The several different coded aperture arrays used mean there are n different aperture or transparency functions $T_i$ and successive exposures, referred to herein as snapshots, with each of these functions result in n signal density function outputs $S_i$. Each of these is accorded a particular weighting $w_i$. The weightings applied may be positive, negative, complex or higher dimensional or a mixture.

To ensure that no energy is put into the system the weightings are chosen such that the sum of the modulus of the weights is one, i.e.

$$\sum_{i=1}^{n} |w_i| = 1 \quad \text{Eqn (22)}$$

The weighted transparency functions are combined into a single equivalent, $$T_{eq} = \sum_{i=1}^{n} w_i T_i \quad \text{Eqn (23)}$$

The actual signals recorded using each of these transparency functions are also composited using the same weightings, $$S_{eq} = \sum_{i=1}^{n} w_i S_i \quad \text{Eqn (24)}$$

The process of modelling m trial points can then be performed but using $T_{eq}$ and $S_{eq}$ instead. This will end up with equation (18) or equation (20) but using the equivalent signal and transparency functions.

It should be noted the transparency function is no longer a binary function but can take on any of the $2^n$ values made up from the sum of the weightings. For instance if $w_1$ was 0.6 and $w_2$ was −0.4 the value of T can be any of 0.6, 0.2, 0 or −0.4. The use of negative weightings is useful as it can reduce the value of $\hat{S}_{eq\,j} \cdot \hat{S}_{eq\,i}$ when $j \ne I$. If w can be negative then $S_{eq}$ and $\hat{S}_{eq\,j} \cdot \hat{S}_{eq\,I}$ can be negative too.

The choice of weightings applied and process of compositing the functions can both be made after the data has been acquired.

It is particularly useful to choose a set of weightings such that the sum of the weightings is zero, i.e.

$$\sum_{i=1}^{n} w_i = 0 \quad \text{Eqn (25)}$$

This can be called a balanced weighting system.

For instance imagine the case that two snapshots are taken and they are given the weighting +½ and −½ respectively. If a particular pixel is transmissive (1) in the first snapshot and also transmissive (1) in the second snapshot the composite value for transparency function for that pixel is +½−½=0. The other possible resultant values are given in the table below;

TABLE 1

| | | Transparency value for pixel in snapshot 2 weighting −½ | |
|---|---|---|---|
| | | 1 | 0 |
| Transparency value for pixel in snapshot 1 weighting +½ | 1 | 0 | +½ |
| | 0 | −½ | 0 |

The possible product of the possible transparency values, $T_1 T_2$ is shown in the table below;

TABLE 2

| | −½ | 0 | 0 | +½ |
|---|---|---|---|---|
| −½ | +¼ | 0 | 0 | −¼ |
| 0 | 0 | 0 | 0 | 0 |
| 0 | 0 | 0 | 0 | 0 |
| +½ | −¼ | 0 | 0 | +¼ |

Now consider that the coded aperture array is formed from a coterminous grid of squares which are either transparent or opaque with equal probability, i.e. the array is formed from a series of square pixels which can either transmit or block light getting to the camera (ignoring any inter pixel gap for now). Take two trial sources which, for simplicity, are a long way from the camera (|l|>>h) and have the same value of K, i.e. they are roughly the same distance from the camera and on boresight.

Figure 4:
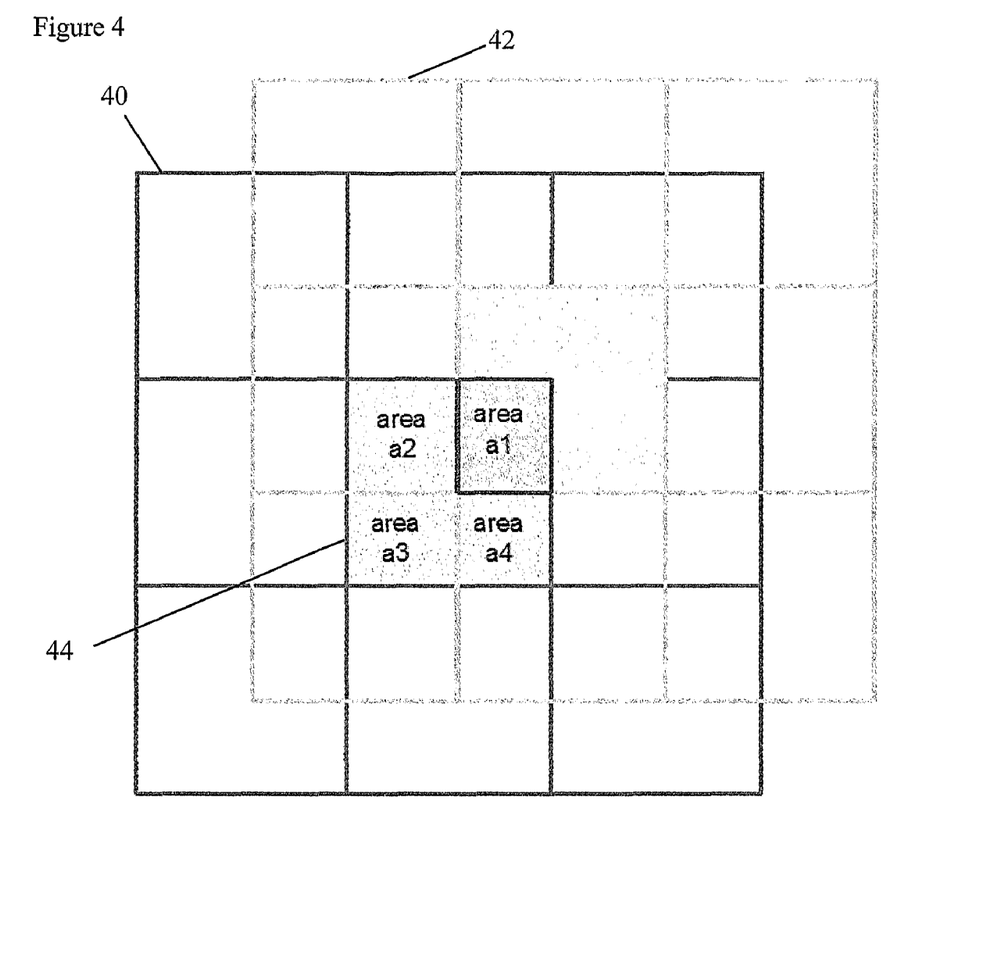
FIG. 4 shows two overlapping grid patterns that may be projected onto the detector array by two different sources.

The pattern on the detector array will be two overlapping images of the mask pattern, shifted with respect to one another due to the different positions of the sources. FIG. 4 illustrates this concept, a first grid 40 is formed on the detector array due to the illumination of the first trial source and a second grid 42, displaced with respect to the first grid, is formed by the second source.

Consider an single square 44 of the first grid. Over the area of this square the contribution from the first trial source is constant and depends on whether the relevant square in the mask is transmissive or opaque. However the area defined by square 44 is also covered by parts of four separate squares of second grid 42, each of which will have an intensity which depends on the transmissivity of the relevant pixel in the coded aperture array. The square 44 can therefore be divided into four separate areas, $a_1$, $a_2$, $a_3$ and $a_4$, each of which may have a different transparency function product.

However where the variables that make up the product in each area are uncorrelated it is possible to consider the average value. In such a case the transparency product for each of the areas $a_1$ to $a_4$ may be any of the product values shown in table 2 with equal likelihood. It can therefore be seen that, on average $$E(\hat{S}_1 \cdot \hat{S}_2) = K^2 A \left( \frac{a_1 \cdot 0 + a_2 \cdot 0 + a_3 \cdot 0 + a_4 \cdot 0}{a_1 + a_2 + a_3 + a_4} \right) = 0 \qquad \text{Eqn (26)}$$

because the expectation value of the transparency product is $$\frac{\frac{1}{4} + 0 + 0 - \frac{1}{4} + 0 + 0 + 0 + 0 + 0 + 0 + 0 + 0 - \frac{1}{4} + 0 + 0 + \frac{1}{4}}{16} = 0$$

Note however that if the trial points are sufficiently close together then part of the detector array may be illuminated by both sources through the same aperture. In this case the transparency functions are no longer uncorrelated. If area $a_1$ represents an area of the detector where light from each source would pass through the same aperture (or be blocked by the same opaque region) then value of each transparency function has to be the same at that point. Thus the only possible products of the transparency functions are the diagonal of table 2, i.e. $+\frac{1}{4}$, 0, 0 and $+\frac{1}{4}$. The expectation value of the transparency function is therefore;

$$\frac{\frac{1}{4} + 0 + 0 + \frac{1}{4}}{4} = \frac{1}{8}$$

Thus in the case of the two sources being close enough to illuminate part of the detector array through the same aperture $$E(\hat{S}_1 \cdot \hat{S}_2) = K^2 A \left( \frac{a_1 \cdot 1/8 + a_2 \cdot 0 + a_3 \cdot 0 + a_4 \cdot 0}{a_1 + a_2 + a_3 + a_4} \right) \qquad \text{Eqn (27)}$$

$$= \frac{K^2 A}{8} \left( \frac{a_1}{a_1 + a_2 + a_3 + a_4} \right)$$

or $$= \frac{\gamma K^2 A}{8}$$

where $\gamma$ is the overlap area of a projected aperture onto the detector array which is illuminated by both sources divided by the total area projected onto the detector array by an aperture.

The balanced weight technique therefore makes $E(\hat{S}_1 \cdot \hat{S}_2)=0$ outside the overlap region. It should be noted that it is not precisely everywhere zero everywhere but it is zero on average.

Because the Central Limit Theorem applies one can think of $\hat{S}_1 \cdot \hat{S}_2$ as a noise signal and regard $\hat{S}_1 \cdot \hat{S}_2$ as a true signal with noise imposed $$\hat{S}_1 \cdot \hat{S}_2 = (1-\gamma)n_{12} + \gamma(E(\hat{S}_1 \cdot \hat{S}_1) + n_{11}) \qquad \text{Eqn (27)}$$

The variance of $n_{12}$ depends upon the variance of $T_1 T_2$ and the variance of $n_{11}$ upon the variance of $T_1 T_1$. These variances reduce with an increased number of snapshots.

Impact of Balanced Weights

As the number of snapshots increase the noise of the signal drops much faster than the means. Therefore by using a plurality of snapshots the $\hat{S}_1 \cdot \hat{S}_2$ terms in the covariance matrix of equation (18) outside the overlap area can be assumed to be zero.

If the trial points are arranged to be sufficiently far apart that there is no area on the detector array that could be illuminated by two trial points though the same aperture then every term other than $\hat{S}_1 \cdot \hat{S}_1$ in the covariance matrix can be set to zero. In other words the covariance matrix becomes a diagonal matrix and equation (20) becomes;

$$\begin{pmatrix} I_1 \\ \vdots \\ I_i \\ \vdots \\ I_m \end{pmatrix} = \begin{pmatrix} \sigma_{\hat{S}_1 \hat{S}_1} + \mu_{\hat{S}_1} \mu_{\hat{S}_1} & \cdots & 0 & \cdots & 0 \\ \vdots & \ddots & \vdots & \ddots & \vdots \\ 0 & \cdots & \sigma_{\hat{S}_i \hat{S}_i} + \mu_{\hat{S}_i} \mu_{\hat{S}_i} & \cdots & 0 \\ \vdots & \ddots & \vdots & \ddots & \vdots \\ 0 & \cdots & 0 & \cdots & \sigma_{\hat{S}_m \hat{S}_m} + \mu_{\hat{S}_m} \mu_{\hat{S}_m} \end{pmatrix}^{-1} \begin{pmatrix} \sigma_{S \hat{S}_1} + \mu_S \mu_{\hat{S}_1} \\ \vdots \\ \sigma_{S \hat{S}_i} + \mu_S \mu_{\hat{S}_i} \\ \vdots \\ \sigma_{S \hat{S}_m} + \mu_S \mu_{\hat{S}_m} \end{pmatrix}$$

This is a huge simplification of the maths required to invert the covariance matrix and makes the solution possible in real time even with large detector arrays.

Even if the trial points are spaced more closely and there is a degree of overlap only the area of overlap need be considered, e.g. every term but $\hat{S}_i \cdot \hat{S}_i$, $\hat{S}_i \cdot \hat{S}_{i+1}$ and $\hat{S}_i \cdot \hat{S}_{i-1}$ could be set to be zero. Thus the matrix to be inverted becomes a thick diagonal matrix. This is a modest increase in the processing required and still represents a huge saving when compared to inverting the full matrix.

Thus a multiple snapshot camera can resolve below one aperture pixel at a distance h with realistically solvable maths. Therefore the resolution of the system need not be dictated by the aperture sizing of the coded aperture array. For any given aperture size the present invention allows an increase in resolution. For a particular resolution this therefore allows larger apertures to be used in the coded aperture array. When considering imaging in the visible or ultraviolet or infrared wavebands the effects of diffraction have to be considered with small apertures. The present invention can relax the aperture size requirements, and hence reduce diffraction effects, whilst still maintaining resolution.

Further the balanced weight method has a significant reduction on detector additive noise due to the expectation that detector noise on a pixel is reduced to zero and its variance is also reduced by the central limit theorem.

The above conclusions have been reached using certain assumptions, for instance square pixels in the coded aperture array and square detector elements. The effect of interpixel gaps in either the coded aperture array or detector array have also been ignored. In reality the coded aperture array may be formed with apertures of any shape and, especially where a reconfigurable coded aperture array means is used, there may be an interpixel gap. The detector array may similarly have pixels of any shape and may have an interpixel gap. These effects will slightly alter the mathematics but the conclusions reached are still applicable and a balanced weights technique offers significant advantage.

Further the coded aperture mask may not be parallel to the detector array or may be a curved array. This obviously will result in more complicated transparency functions but again the principles behind the invention are applicable.

The invention claimed is:

1. A method of processing data from a coded aperture imaging apparatus comprising the step of taking a plurality of frames of data, each frame of data obtained using a different coded aperture array to image the same scene, taking the plurality of aperture functions corresponding to the coded aperture arrays used to acquire the data, applying a weighting to each aperture function and applying the same weighting to the respective frame of data, combining the weighted aperture functions into a combined aperture function and combining the weighted frames of data into a combined frame of data.

2. A method as claimed in claim 1 wherein the weightings are arranged such that the sum of all of the weightings applied is zero.

3. A method as claimed in claim 1 wherein the weightings used are a combination of any of positive, negative, complex and higher dimensional weightings.

4. A method as claimed in claim 1 wherein the sum of the modulus of weightings applied is equal to one.

5. A method as claimed in claim 1 further comprising the step of forming a covariance matrix for the combined aperture function for a set of trial points.

6. A method as claimed in claim 5 further comprising the step of convolving the combined frame data with the combined aperture function.

7. A method as claimed in claim 6 further comprising the step of inverting the covariance matrix and then multiplying it by the convolution integral.

8. A method as claimed in claim 5 wherein the step of forming the covariance matrix involves the step of making each term of the matrix zero outside of a trial point overlap region.

9. A method as claimed in claim 1 further comprising the step, prior to combining the frames of data, of adjusting at least some of the frames to account for relative motion with respect to the scene.

10. A method as claimed in claim 9 wherein the adjustment to the frames of data is based on a model of the relative motion when the frames are acquired.

11. A method as claimed in claim 9 further comprising the step of taking at least two frames of data that were acquired using the same coded aperture array but at different times and comparing the two frames of data to determine any relative motion.

12. A method as claimed in claim 9 wherein, after adjusting for any relative motion, weightings are applied to the adjusted frames and the weighted frames combined.

13. A method as claimed in claim 12 wherein the most recent image has the strongest weighting.

14. A method as claimed in claim 1 wherein the method comprises the step of periodically comparing at least two combined frames of data formed by imaging the same part of the scene at different times in order to determine whether there has been any motion in the scene.

15. A method as claimed in claim 14 wherein image processing is concentrated on parts of the scene where motion has occurred.

16. A method of coded aperture imaging comprising the step of imaging a scene with coded aperture imager, acquiring several frames of data, each frame of data being acquired using a different coded aperture array and processing the frames of data in accordance with the method of claim 1.

17. A method as claimed in claim 16 wherein the coded aperture arrays are formed from a coded aperture function combined with a tile function.

18. A method as claimed in claim 17 wherein several frames are acquired with fractal tile functions and composited to form a single tile.

19. A method as claimed in claim 17 wherein at least one frame is acquired using a coding equivalent to a tile function.

20. A coded aperture imager comprising a detector array arranged to receive radiation from a scene via a reconfigurable coded aperture array means, wherein the reconfigurable coded aperture array means is adapted to successively provide a plurality of different coded aperture arrays and further comprising a processor adapted to process the output from the detector array using the method of claim 1.

* * * * *